Figure 1:
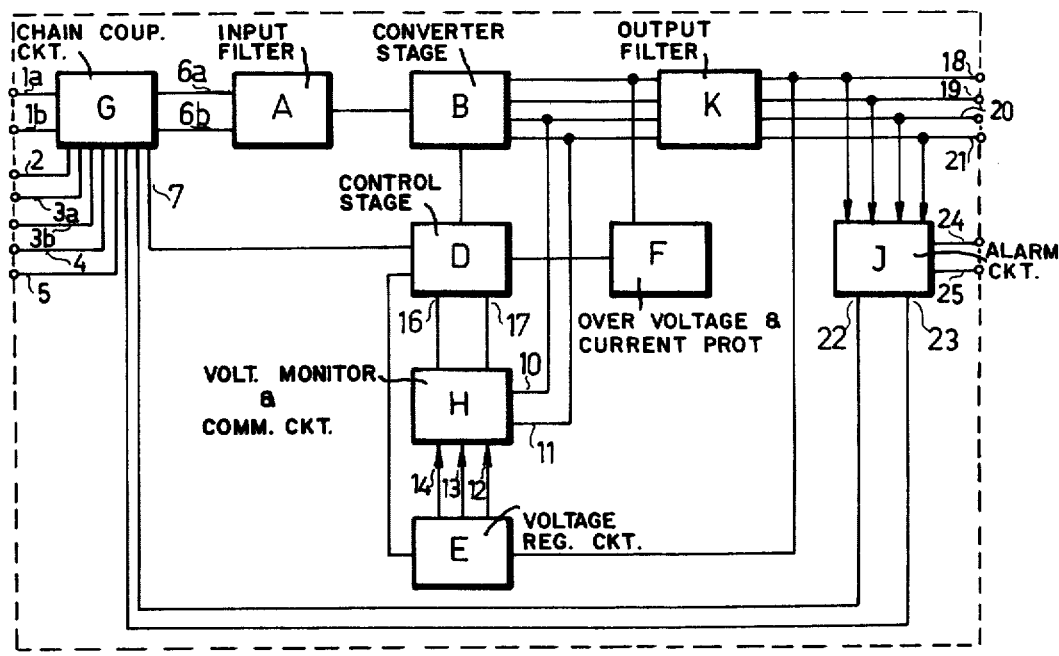

United States Patent [19]

Forró et al.

[11] 4,309,748
[45] Jan. 5, 1982

[54] DC/DC STABILIZED VOLTAGE CONVERTER UNIT

[75] Inventors: Dezső Forró; Dezső Balogh; László Császár; László Tölgyesi; Endre Havalda, all of Budapest, Hungary

[73] Assignee: BHG Hiradástechnikai Vállalat, Budapest, Hungary

[21] Appl. No.: 83,594

[22] Filed: Oct. 11, 1979

[30] Foreign Application Priority Data

Nov. 16, 1978 [HU] Hungary ............................ HI 499

[51] Int. Cl.³ ............................................. H02M 3/00
[52] U.S. Cl. ......................................... 363/65; 363/79; 307/82; 307/86; 340/660
[58] Field of Search ................. 363/15, 50, 65, 67–68, 363/71, 74, 76–79; 307/82, 85–87; 340/657, 660, 661, 662, 663, 664

[56] References Cited

U.S. PATENT DOCUMENTS

| 3,333,179 | 7/1967 | Freeman ............... | 363/49 |
| 3,440,492 | 4/1969 | Carmody ............... | 307/86 |
| 3,631,332 | 12/1971 | Williamson ........... | 363/49 |
| 3,652,867 | 3/1972 | Zinn ..................... | 307/86 |
| 4,013,938 | 3/1977 | McCoy ................. | 307/82 X |

Primary Examiner—William M. Shoop
Assistant Examiner—Peter S. Wong

[57] ABSTRACT

In a DC/DC stabilized voltage converting unit having a series circuit including an input filter, a converter stage having a control input and an output filter, the improvement comprising: a control stage having an output connected to the control input; a voltage regulating circuit receptive of an output of the output filter and having an output applied to the control stage; an anti-overvoltage and anti-overcurrent stage receptive of an output of the converter stage and having an output applied to the control stage; a voltage converter chain coupling circuit for effecting the linking of units in a chain; an internal monitoring and commutating circuit connected between the voltage regulating circuit and the control stage for surveying the outputs of the converter stage; a visually and electrically signalling alarm circuit receptive of the outputs of the output filter and having the outputs thereof applied to the chain coupling circuit; and wherein the chain coupling circuit includes a first input for linking to one pole of a power supply source, a coupling terminal connectable to said one pole of the power supply source, a third input for connecting to the coupling terminal of the next chain coupling circuit in the chain, first and second outputs connected to the input filter and a third output connected to the control stage.

5 Claims, 4 Drawing Figures

DC/DC STABILIZED VOLTAGE CONVERTER UNIT

The subject of the suggested invention is a DC/DC stabilized voltage converting unit, suitable for powering large telecommunication installations, in particular, for supplying telephone exchange installations with internal voltages. As it is widely known, electronic instruments and small computers need but one voltage converter, while bigger computers or computing centers requires usually several voltage converting circuits. Large telecommunication installations as well as electronic telephone exchanges claim the use of several voltage converters.

Internal voltages for telephone exchanges, especially for electronic program controlled telephone exchanges, are produced on the base of battery voltage, or voltages gained from battery eliminators (rectifiers) by applying voltage converters. If the exchange operation requires several voltage converters, these converters should never be switched on simultaneously neither in cases of putting into operation nor in case of automatic switching-on processes when battery eliminators are used nor for whatever other reason.

One of the reasons for such limitation may be, that the total capacitance of the telephone exchange circuitry can reach vast values, requiring preferably gradual charging. The other reason is, that the putting into operation or the switching-on of the different circuits of the telephone exchange should be executed in a well-determined order. The switching-on process of an electronic programcontrolled telephone exchange begins from running a zeroing and setting program through the control system of the telephone exchange. This program ensures the starting of the factual program from a pre-determined program point. According to the program the control unit of the telephone exchange should be switched on first of all. The switching-on of the power supply, powering the cross-point network, should be done only after having the control unit already switched on, to avoid needlessly much cross-point up-switchings during the setting program. Consequently, the switching-on of the voltage converters, producing internal voltages for the telephone exchange circuitry, should be implemented correspondingly to a determined sequence.

Ensuring the disturbanceless and uninterrupted operation of telecommunication installations, as telephone exchanges are among others, raises a further problem. The solution of this problem requires often establishing standy units besides the basic units, inclined to cause shutdown by their troubles. Applying standby units in some transmission installations (e.g. Ericsson system installations) and in telephone exchange installations is implemented by connecting the standby unit in parallel with the basic one, but the outputs of the power supply units have a separating series diode circuit. The disadvantage of this solution is the considerable dissipation loss of the diodes.

Furthermore, it is important for telecommunication installations that the breakdowns of the circuitry units should be followed by an alarming signal, informing the operating staff about the breakdowns. It is important as well that the alarming system should be as simple as possible for the sake of the easiest localization of the occurred troubles. Alarming systems, applied presently in telecommunication installations, are too sophisticated, so their handling requires specialized workers.

The DC/DC stabilized voltage converter, known from the USA patent description, registered under the U.S. Pat. No. 1,411,115, consists of usual stages, namely, of input, control, converter, voltage regulator and output stages. This voltage converter, however, is of sophisticated layout, it is built up without chain-coupling circuits and checking contrivances.

A similar solution has been published in the Hungarian patent description of 162,342 registration number; but it has the same disadvantages, mentioned above.

Our goal is to produce a solution free of these disadvantages. According to this goal the invented DC/DC stabilized voltage converter unit, proposed for providing large telecommunication installations and especially telephone exchanges with internal voltages, consists of input, converter, control, voltage regulator, output, overvoltage and overcurrent hindering stages, and besides incorporates a chain-coupling circuit, one or several internal monitoring and switch-over circuits suitable for surveying the output voltages, as well as an alarming circuit providing both visualized and electric signals.

The chain-coupling circuit, the internal monitoring and switch-over circuit, allowing the monitoring of one or several output voltages, as well as the visually and electrically signalling alarm circuit, link the widely known other elements of the voltage converter in the following way. The first input of the chain-coupling circuit is connected to one pole of the power supply source and its second input joins the other pole of the power supply source. The third input of the chain-coupling circuit connects—directly or through a remote switch—with one of the power supply connecting wires of the chain-coupling circuit, representing the previous link of the chain, composed of chain-coupling circuits. The fourth input of the chain-coupling circuit connects with the remote switch, while its first and second output join the input filter, and the third output links the inhibitory wire of the control stage. The two inputs of the monitoring and commutating circuit are connected with the outputs of the converting stage; its further three inputs link the outputs of the voltage regulating circuit. The outputs of the internal monitoring and commutating circuit are interconnected with the inputs of the control stage. The inputs of the visually and electrically signalling alarm circuit are connected to the output points of the output filter, representing the output of the voltage converting circuit; its two outputs link two points of the chain-coupling circuit and other two outputs join the central alarming circuit, known in itself.

The chain-coupling circuit contains a first and a second relay. The break contact of the first relay on one hand links the capacitor, connected to the first and second outputs of the chain-coupling circuit and links its third output on the other; the first make contact of the relay joins the two ends of the resistor, connected to the first input and the second make contact of the relay, is connected—through the make contact of the second relay—with the resistor and the capacitor, as well as with the wire connecting to the power supply source.

The diode of the first opto-coupling element of the monitoring and commutating circuit is series-connected with a resistor and links two inputs. The emitter of the transistor of the first opto-coupling element joins a resistor in series and links one of the further three inputs. The other two inputs are interconnected with the diode of the second opto-coupling elements. The emitter and the collector of its transistor forms the output of the monitoring and commutating circuit and they are interconnected in parallel with a capacitor and a resistor.

The collector of the transistor of the first opto-coupling element joins the reference voltage. The voltage converter is provided with a hot-standby unit. Owing to this hot-standby circuit the commutation, implemented by the internal monitoring and commutating circuit, is ensured without interrupting the supply current.

The light-emitting diode of the visually and electrically signalling alarm circuit is connected in series with a resistor and a relay, and is interconnected with two outputs of the voltage converter. Its other light-emitting diode is connected in series with a further resistor and a relay and is interconnected with two other outputs of the voltage converter. This relay is parallel-connected with the output of the visually and electrically signalling alarm circuit, linking the chain-coupling circuit. The series-connected contacts of the relays are interconnected with the central alarming circuit. The advantage of the solution, suggested by the invention is, that it ensures the switching-on of the voltage converters—producing internal voltages—according to a determined order.

The chain-coupling circuit affords the remote switching-on and switching-off of the voltage converter unit. A further advantage of the solution is, that the voltage converter circuit is provided with a hot-standby system which takes over the load from the basic unit immediately in the case of its breakdown without interrupting the supply current.

The standby power supply unit links the outputs of the basic power supply unit via the simplest parallel connection, without inserting any intermediate element. The solution, offered by our invention, provides the possibility of monitoring all outputs of the power supply unit, producing several different voltages and ensures the necessary commutations in the case of the failure of whichever voltage. The layout of the visual and electrical signalling alarm circuit is simple, its handling does not require any expertness and the broken down unit can easily be localized and replaced by the aid of the circuit. After the appearance of the supply voltage in a condition of normal operation in the subunits, the visual and electrical signalling alarm circuit short-circuits the starting wires of the power supply unit following in the chain-coupling series after it and prevents the chain from being interrupted.

The more detailed description of the implementation examples of the invention is presented below by help of the following figures.

FIG. 1: Block diagram of the DC/DC stabilized voltage converter unit according to the invention.

Figure 2:
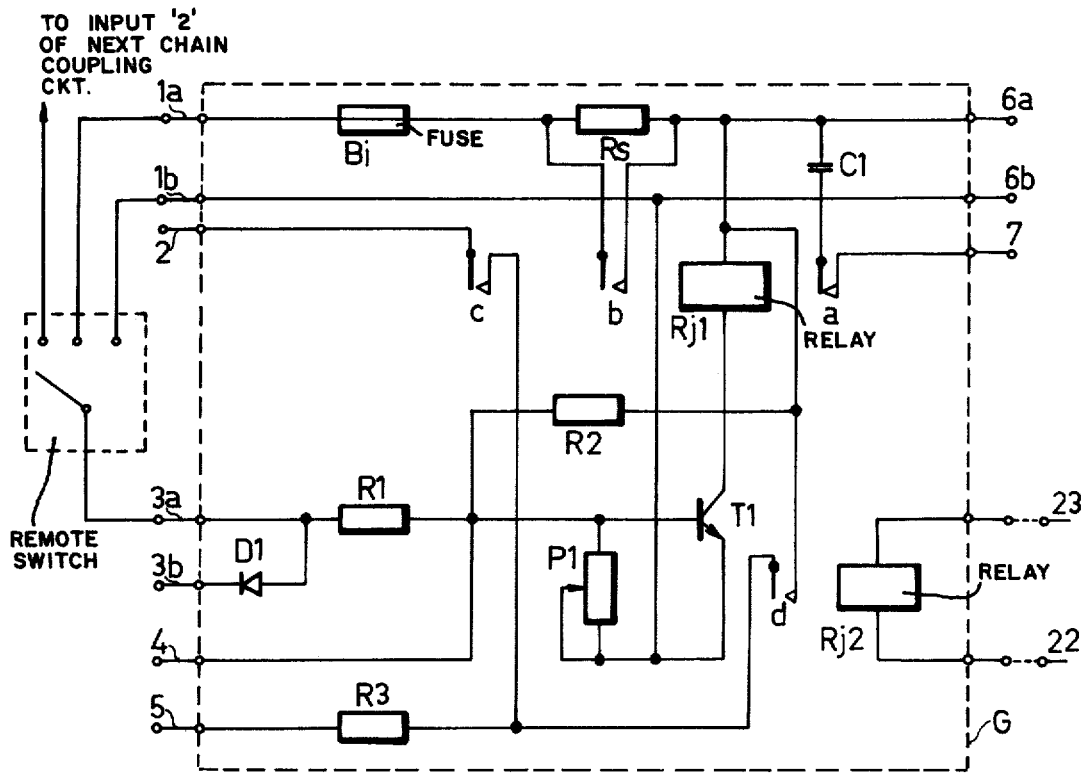

FIG. 2: Circuit diagram of the chain-coupling circuit of the DC/DC stabilized voltage converter unit according to the invention.

Figure 3:
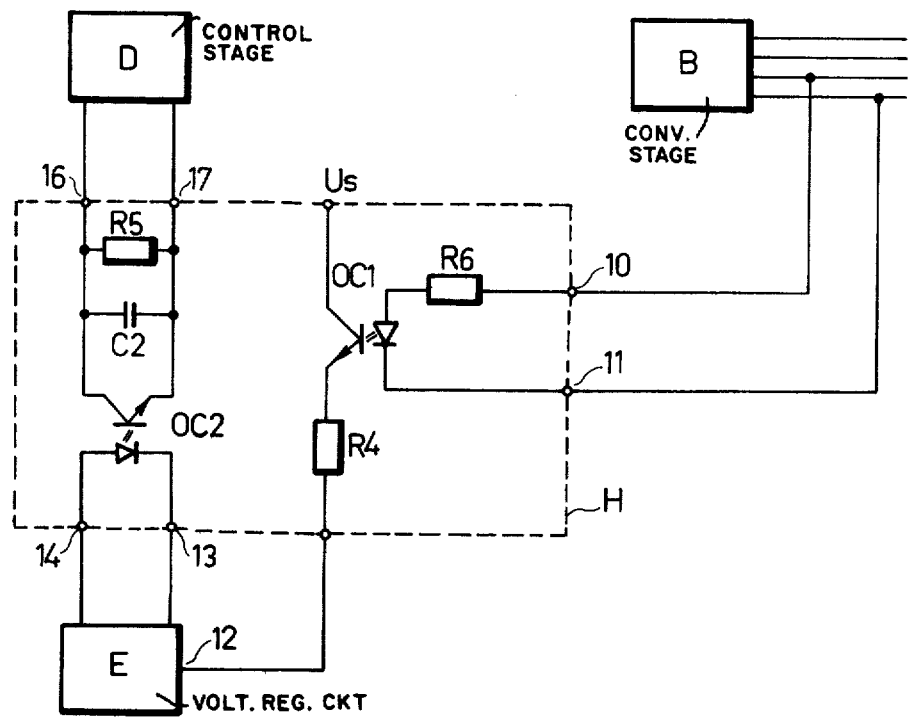

FIG. 3: Circuit diagram of the internal monitoring and commutating circuit of the DC/DC stabilized voltage converter unit according to the invention.

Figure 4:
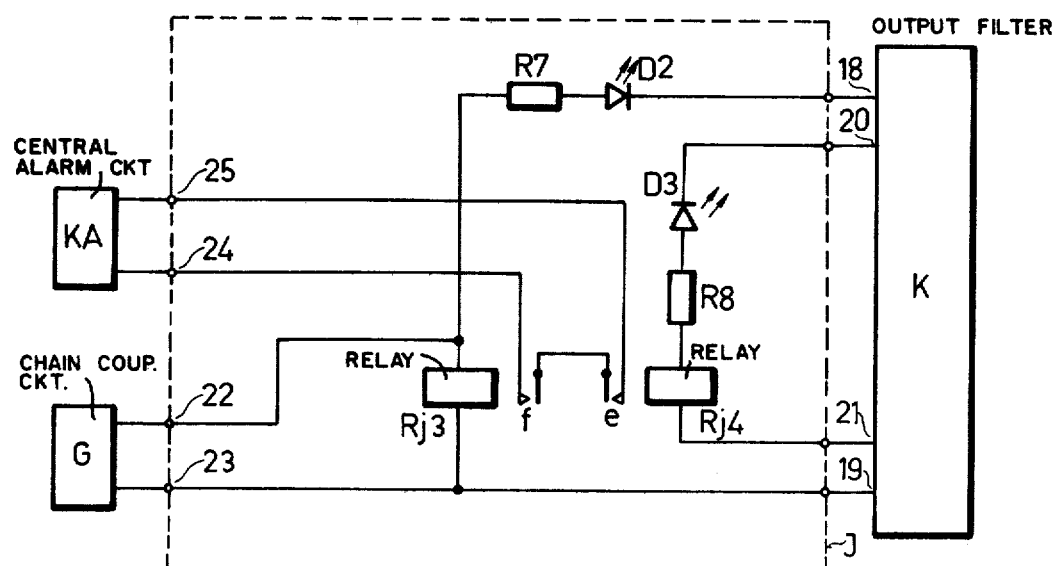

FIG. 4: Circuit diagram of the visually and electrically signalling alarm circuit of the DC/DC stabilized voltage converter unit according to the invention.

The invented DC/DC stabilized voltage converter unit contains the series-connected input filter A, the converter stage B and the output filter K (FIG. 1).

Furthermore, the DC/DC stabilized voltage converter is provided with the control stage D, voltage regulating circuit E, as well as with the anti-overvoltage and anti-overcurrent stage F. The voltage converter includes the chain-coupling circuit G, one or severally internal voltage monitoring and commutating circuits H, suitable for surveying the output voltages, as well as the visually and electrically signalling alarm circuit J. The first input 1a of the chain-coupling circuit G is connected to one pole of the power supply source, not shown on the figure; its second input 1b links the other pole of power supply source. The third input 3a of the chain-coupling circuitry G—directly or through a remote switch—connects with one of the power supply connecting wires (the wire 2) of the chain-coupling circuit G, representing the previous link of the chain, composed of chain-coupling circuits, while the third input 3a of the chain-coupling circuit G of the power supply, representing the first term in the chain, joins the first input 1a directly or through a remote operated switch. In the case of a telephone exchange having identical units—joining each other like the links of a chain—the points 4 and 5 of the first chain-coupling circuits G of the detached chain sections, are interconnected. Owing to this interconnection the first term of the chain section becomes a self-holding one and it prevents the chain from the total decomposition in the case of disconnection of the first chain section. The first output 6a and the second output 6b of the chain-coupling circuit G is connected with the input filter A, and its third output 7 joins the inhibitory wire of the control stage D. The control stage D joins also the converter stage B, as well as the anti-over-voltage and antiovercurrent stage F. The outputs 16 and 17 of the internal monitoring and commutating circuit H joins two inputs of the control stage D, while the inputs 10 and 11 of the internal monitoring and commutating circuit H join two outputs of the converter stage B; its further three inputs 12, 13, 14 join the outputs of the voltage regulating circuit E. The voltage regulating circuit E meets directly the control stage D and the point 18 of the output filter K, representing one of outputs of the voltage converter. The anti-overvoltage and anti-overcurrent stage F joins one of outputs of the converter stage B. The inputs of the visually and electrically signalling alarm circuit J of the voltage converter are interconnected with the points 18, 19, 20, 21 of the output filter K, representing the outputs of the voltage converter. The two outputs 22 and 23 of the alarm circuit J link two points of the chain-coupling circuit G, while its further two outputs 24 and 25 are interconnected with the central alarming circuit KA, known by itself.

The implementation version of the chain-coupling circuit G, shown in the FIG. 2, contains the fuse Bi and the resistor Rs, connected in series with the input 1a. At the same time the resistor Rs links the first output 6a as well. The break contact a of the first relay Rj1 of the chain-coupling circuit G at one hand joins the capacitor C1, connected to the first output 6a and the second output 6b; this same break contact joins the third output 7 on the other hand. The first make contact b of the first relay Rj1 joins the two ends of the resistor Rs, while its second make contact c links the resistor Rs and the capacitor C1 through the make contact d of the second relay Rj2; its other pole joins the wire 2. One end of the first relay Rj1 joins the make contact d, as well as the third input 3a through the series-connected resistors R2 and R1. The other end of the first relay Rj1 links the collector of the transistor T1. The emitter of this transistor T1 is interconnected with the second input 1b, and its base joins the third input 3a through the resistor R1. The emitter-base circuit of the transistor T1 includes the potentiometer P1. The common point of the resistors R1 and R2 is connected with the point 4 of the chain-coupling circuit G; the other end of the resistor R1 joins the fourth input 3b through the diode D1. The common point of the second make contact c of the first relay Rj1 and of the make contact d of the second relay Rj2 links the point 5 of the chain-coupling circuit G through the resistor R3.

The operation of the chain-coupling circuit of the DC/DC stabilized voltage converting unit of the present invention can be summarized as it follows below.

The primary input voltage appears on the first input 1a and the second input 1b. The large capacitance capacitor C1 charges through the resistor Rs. The transistor T1 opens upon the arrival of a starting signal at point 3a and provides an inhibitory signal for the control stage D through the break contact a of the first relay Rj1 and the third output 7; this signal inhibits the control, i.e. the energy transmission. When the capacitor C1 is charged up to approximately 80% of the nominal input voltage value, the first relay Rj1 operates and short-circuits the resistor Rs through the first make contact b. The break contact a of the first relay Rj1 gets disrupted and the inhibitory signal will disappear from the third output 7. Now the voltage appears on the output of the converter. The second relay Rj2 operates under the effect of the voltage, provided by the outputs 22, 23 of the visually and electrically signalling alarm circuit J. Then a positive voltage gets to the point 5 of the chain-coupling circuit G through the resistor R3, which voltage appears on the wire 2 too. When the primary input voltage appears at the inputs 1a and 1b of the voltage converter following in the chain, the capacitor C1 of the next one gets charged up as well. Since the wire 2 links the third input 3a of the voltage converter, following in the chain, the transistor T1 in it will be open. When the charging of the capacitor C1 reach approximately 80% of the nominal value of the input voltage, then the above described process will again take place and continue through the whole chain. Points 4 and 5 of first term of each chain section are interconnected with each other. After the operation of the second relay Rj2 this voltage converter becomes self-holding. The switching-off process by the remote switch can be realized by a short-time interconnecting of the third input 3a and of the second input 1b. When switching on, the third input 3a should be interconnected with the first input 1a for a short while. The switching-on and switching-off of all power supplies by a remote switch can only be realized by the separate or simultaneous switching off of the first terms of all sections. If only one switch is applied for switching off, the remote switching wire of the first term of the first section should be connected to the third input 3a. In the case of further sections their first terms should be connected to the fourth input 3b, that provides diode separation owing to the diode D1. The points 4 and 5 of the terms inside the sections should not be interconnected, so these terms are not self-holding ones.

Central position switches are provided for realizing the switching-on and switching-off processes by remote switches. Several of them are inserted in the case of sectioned switching-off. The switching can be realized in an automatic way by applying signals of determined length.

The solution, suggested by the invention, can be advantageously applied to surveyless mode of operation, if the primary voltage, appearing on the first input 1a and the second input 1b, is produced by an AC/DC voltage converter on the base of the mains voltage, without a buffer battery. The application of this solution is advantageous as well in such cases where there is a buffer battery, but the disappearance of the mains voltage is possible. If the mains voltage disappears, the primary voltage of the first input 1a and the second input 1b disappears as well and as consequence of course the secondary voltage will be missing too. After the reappearing of the mains voltage the primary voltage appears again on the first input 1a and the second input 1b. According to the already explained reasons the putting into operation of the system in a determined sequence is a requirement; this sequence should be the chain-coupling order, according to the normal switching-on process. This problem can be resolved by the voltage converter of the invention, since the disappearing voltage puts the first relay Rj1 and the second relay Rj2 into the released state. If the voltage reappears at the first input 1a and the second input 1b, the switching-on will take place as it was already explained.

The remote switching signal should appear on the third input 3a of the first term of the chain in the case of remote switching. If remote switching is not used, the third input 3a should be directly interconnected with the first input 1a.

The internal monitoring and commutating circuit H includes the first opto-coupling element OC1 and the second opto-coupling element OC2 (FIG. 3). The diode of the first opto-coupling element OC1 is series-connected with the resistor R6 and joins the inputs 10, 11, while the emitter of its transistor is series-connected with the resistor R4 and joins the input 12. Its other two inputs 13, 14 are interconnected with the diode of the second opto-coupling element OC2, while the emitter and collector of its transistor form the outputs 16, 17 of the internal monitoring and commutating circuit H, and are parallel-connected with the capacitor C2 and the resistor R5. The collector of the transistor of the first opto-coupling element OC1 joins the reference voltage Us. The task of the internal monitoring and commutating circuit H of the voltage converter is to provide the hot-standby mode of operation, depending on all output voltages.

If the normally operating equipment gets broken down, the voltage of the buffer capacitor in the converter stage B drops below the required value. The voltage converter, operating as a hot-standby unit, detects that and takes the load over upon itself gradually, without transients. The outputs of the voltage converter have usually different loads. The control stage D and the voltage regulating circuit E of the applied voltage converter are in direct connection with the output, transferring the biggest power. If this output gets broken down, the circuit consisted of the second opto-coupling element OC2, the capacitor C2 and the resistor R5, carries out the putting into operation of the hot-standby unit, that will occur in the following way. The voltage of the voltage converter chosen for operating as hot-standby unit should be lower by some 100 mV, than the output voltage of the basic voltage converter. In consequence of such setting the hot-standby unit, connected in parallel with the basic voltage converter, will not deliver power for the consumer, since the current of the diode of the second opto-coupling element OC2 under the effect of the signal, coming from the voltage regulating circuit E, opens the transistor. The transistor blocks the operation of the control stage D namely in such a phase, that the output transistor(s) of the converting stage B known by itself remain(s) in the closed state. If the output voltage of the basic voltage converter ceases gradually, the transistor gets closed because of the gradual cessation of the current through the diode of the second opto-coupling element OC2. As a consequence, the blocking of the control stage D will be lifted and the hot-standby unit takes gradually over the producing of the output power.

The delaying circuit made of the capacitor C2 and the resistor R5 prevents the equipment from switching-over because of incidental noise.

Further voltages of the basic voltage converter get its transistor opened, for example because of the diode current of the first opto-coupling element OC1, connected to the inputs 10, 11. The voltage regulating circuit E detects this current and this, together with the effect of the reference voltage Us, controls the voltage regulator so, that one of the two inhibitory signals of logic OR relation gets blocked.

If the output voltage of the basic power supply ceases, the first opto-coupling element OC1 gets closed. The voltage regulating circuit E detects this closing and inhibits the operation of the basic power supply unit that starts the gradual loading of the hot-standby unit, connected in parallel with the basic one.

The light-emitting diode D3 of the visually and electrically signalling alarm circuit J of the DC/DC stabilized voltage converter unit, according to the invented solution, is series-connected with the resistor R8 and the relay Rj4, and joins two outputs 20, 21 of the voltage converter (as it is shown on the FIG. 4). Its other light-emitting diode D2 through the further series-connected resistor R7 and the relay Rj3 joins other two outputs of the voltage converter. The relay Rj3 is parallel-connected with output 22, 23 of the visually and electrically signalling alarm circuit J, being connected to the chain-coupling circuit 6. The series-connected contacts f, e of the relays Rj3 and Rj4 are connected to the central alarm circuit KA.

During the normal operation of the power supply unit the light-emitting diodes D2 and D3 light, the relays Rj3, Rj4, as well as the relay Rj2, connected in parallel with the relay Rj3, are in the operated state. The series-connected contacts f, e of the relays Rj3 and Rj4 signal the normal operation of the power supply unit towards the central alarm circuit KA. If the power supply unit has further secondary outputs, further series-connected light-emitting diodes, resistors and relays should be connected to its outputs; the contacts of these relays should be connected in series with the contacts e and f. If some of the voltages fail, the diode, connected to its output, goes out, the relay releases, its contacts get disrupted and the central alarm circuit KA of electrical operation signals. The signalling directs the attention of the operator staff to the breakdown. The went out light-emitting diode represents a visual signalling, localizing the failure; owing to that the breakdown supply unit can be replaced, i.e. the failure can be eliminated.

If the broken down power supply unit is the first term of the chain section and it does not have a hot-standby unit, then after the releasing of the second relay Rj2, mounted in the chain-coupling circuit G, all the other power supply units, belonging to the chain section, get switched off as well. If the first term of the chain section is supplied with hot-standby unit, but the connecting supply cable is short-circuited, then the standby unit can not get into operation, nevertheless this chain section switches off as well. Thus the solution, suggested by the invention, is suitable for achieving the set aim.

What we claim is:

1. In a dc/dc stabilized voltage converting unit having a series circuit including an input filter, a converter stage having a control input and an output filter, the improvement comprising: a control stage having an output connected to the control input; a voltage regulating circuit receptive of an output of the output filter and having an output applied to the control stage; an anti-overvoltage and anti-overcurrent stage receptive of an output of the converter stage and having an output applied to the control stage; a voltage converter chain coupling circuit for effecting the linking of units in a chain; an internal monitoring and commutating circuit connected between the voltage regulating circuit and the control stage for surveying the outputs of the converter stage; a visually and electrically signalling alarm circuit receptive of the outputs of the output filter and having the outputs thereof applied to the chain coupling circuit; and wherein the chain coupling circuit includes a first input for linking to one pole of a power supply source, a second input for linking to the other pole of a power supply source, a coupling terminal connectable to said one pole of the power supply source, a third input for connecting to the coupling terminal of the next chain coupling circuit in the chain, first and second outputs connected to the input filter and a third output connected to the control stage.

2. The voltage converting unit according to claim 1, wherein the chain coupling circuit comprises first and second relays, a capacitor connected between a break contact of the first relay and the first output, said break contact being connected to the third output, a resistor connected between the first input and the first output, a first make contact of the first relay being connected across the resistor and a second make contact of the first relay connected to the resistor, the capacitor and coupling terminal through a make contact of the second relay.

3. The voltage converting unit according to claim 1, wherein the monitoring and commutating circuit comprises a first opto-coupling element having a diode connected in series with a second resistor and forming the input terminals of the circuit and a transistor with the emitter thereof connected in series with a resistor and one input of the circuit and the collector thereof connected to a reference voltage and a second opto-coupling element having a diode whose terminals form the remaining inputs of the circuit and a transistor whose collector and emitter form the outputs of the circuit with a capacitor and resistor connected in parallel thereacross.

4. The voltage converting unit according to claim 1, wherein the alarm circuit comprises a first light-emitting diode connected in series with a resistor and a relay, with the terminals of the series connected elements forming two inputs of the alarm circuit, a second light emitting diode connected in series with a second resistor and second relay, with the terminals of the second series connected elements forming two further outputs of the alarm circuit, the second relay being connected in parallel with two outputs of the alarm circuit for connecting to the chain coupling circuit and wherein the make contacts of the two relays are connected across to output terminals for connecting to a central alarm circuit.

5. The voltage converting unit according to claim 1, further comprising a remote switch connected to the coupling terminal and for connecting the third input of the next chain coupling circuit.

* * * * *